Sept. 22, 1936.  E. W. SHERMAN  2,055,137
ROTARY ENGINE
Filed Aug. 21, 1933   3 Sheets-Sheet 1
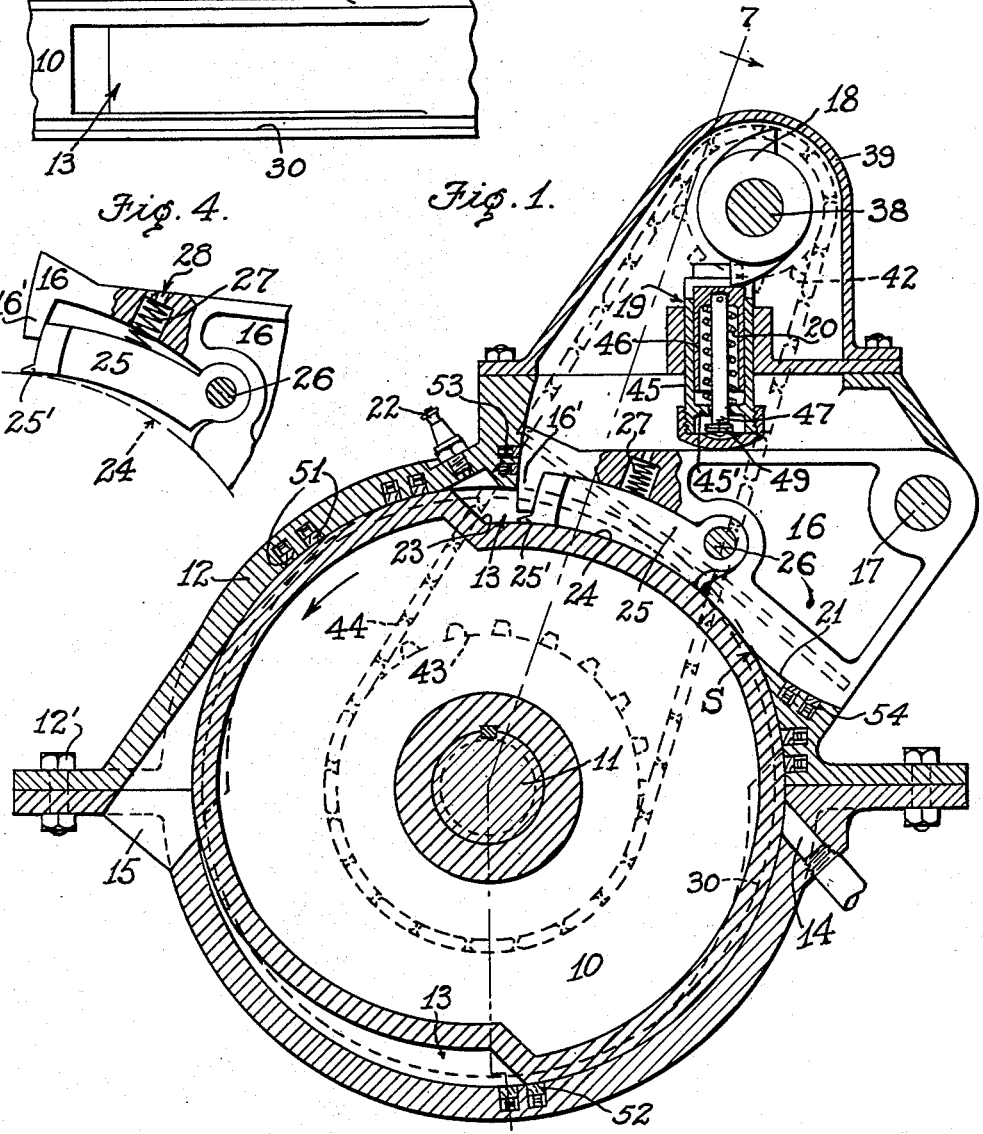
INVENTOR.
Elmer W. Sherman Sept. 22, 1936.   E. W. SHERMAN   2,055,137
ROTARY ENGINE
Filed Aug. 21, 1933   3 Sheets-Sheet 2
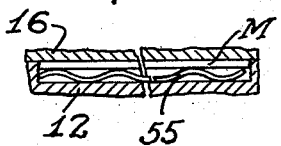
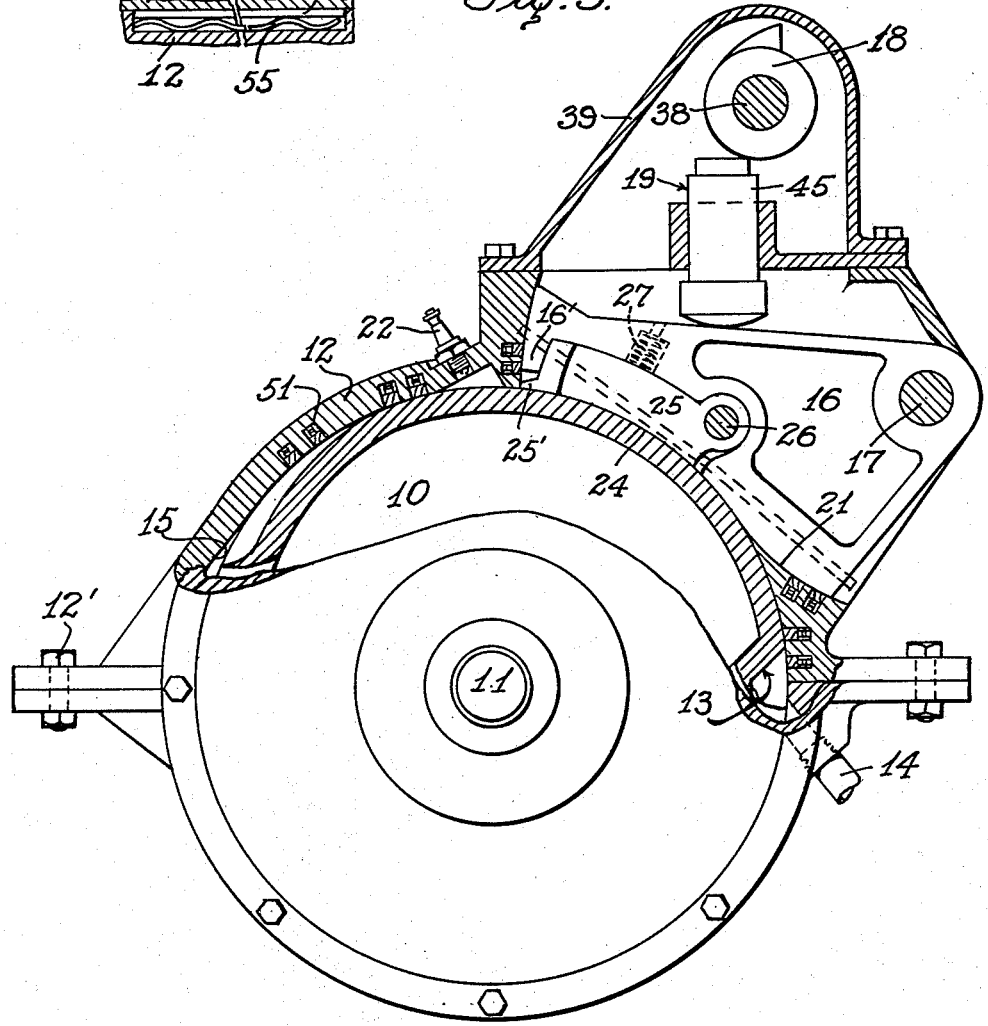
INVENTOR.
Elmer W. Sherman

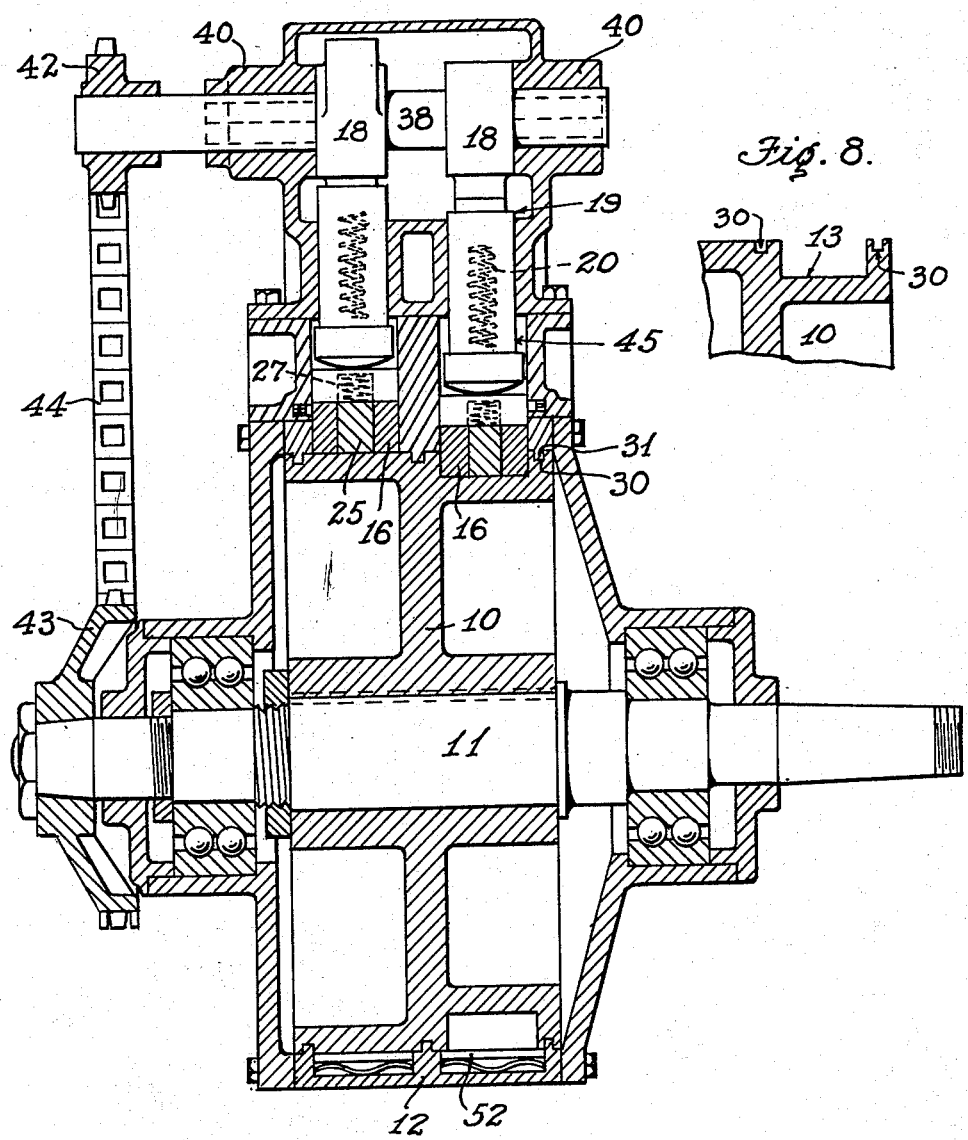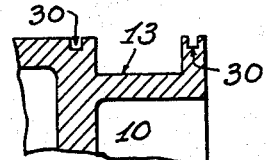

Patented Sept. 22, 1936

2,055,137

UNITED STATES PATENT OFFICE 2,055,137

ROTARY ENGINE

Elmer W. Sherman, Los Angeles, Calif., assignor of one-half to Gerald E. Marks, Los Angeles, Calif.

Application August 21, 1933, Serial No. 686,126

5 Claims. (Cl. 123—15)

This invention relates to internal combustion engines and particularly to the rotary type. Primarily the object of the invention is to provide an engine which will be simple, compact, efficient and comparatively inexpensive. It is a particular object of the invention to provide for simple and efficient compression means which may in general perform in extremely simple fashion all of the functions of the four-stroke cycle reciprocating engine, and to eliminate substantially all of the duplication of parts incident to a reciprocating engine. The structure of the present invention comprises a rotor carrying in its periphery a series of explosion chambers or pockets into which compression elements are forced as by means of cams or springs for the purpose of compressing a previously taken explosive charge. Upon proper setting of the compression member, explosion takes place, the adjacent end of the compression member acting in a sense as an explosion head, whereby the rotor is propelled forward by the force of the explosion until an exhaust port is uncovered. In the preferred form the compression member comprises an oscillating bar or block curved on its inner face to cooperate with correspondingly curved faces on the rotor. The rotor may be composed of one or more sections each of which carries explosion chambers in its periphery, there being a compressor member for each rotor section. The cycle of operation comprises injection of an explosive mixture, compression of the explosive mixture by means of the compressor member, explosion at the head of the compressor member, and exhaust of the spent gases as the chamber passes an exhaust port.

The invention may be briefly stated as residing in a rotary explosion engine comprising a rotor mounted within a housing, peripherally disposed explosion chambers adapted to receive explosive mixture, and compression members adapted to be forced into the explosion chambers for the purpose of compressing the mixture prior to ignition. The invention extends to such a structure where the compression member is a swinging or oscillating block actuated by springs, cams or other forces or otherwise suitably movable for the purpose. The invention is sufficiently broad to cover such a structure where the explosion chambers are carried in either the casing or the rotor, the compressor being carried by the other of these two members.

In the accompanying drawings wherein one embodiment of the invention is disclosed by way of illustration:

Fig. 1 is a vertical cross section through the engine, portions being broken away better to illustrate the construction;

Fig. 2 is a fragmentary plan view of a portion of the periphery of the rotor showing one of the firing pockets or chambers therein;

Fig. 3 is a transverse section through the compressor block of Fig. 1 showing the relation of the two parts comprising the block;

Fig. 4 is an enlarged detail taken approximately on the line 4—4 of Fig. 3;

Fig. 5 is in part an end elevation and in part a vertical cross section showing the rotor advanced about 90° from the position of Fig. 1;

Fig. 6 is a detail of compression retainers used;

Fig. 7 is a vertical axial section taken on the line 7—7 of Fig. 1; and

Fig. 8 is a fragmentary transverse section through the rotor.

According to the form sketched in these drawings, a rotor 10 is carried by and keyed or splined upon the driven engine shaft 11 which is journaled in a casing 12, formed in two parts bolted together at 12'. The periphery of the rotor 10 is provided with a plurality of countersunk explosion chambers 13, preferably arranged in series. If desired, the rotor may comprise more than one section, two being illustrated, each section carrying at its periphery a series of the explosion chambers 13. The casing 12 is provided with inlet ports 14 for purposes of supplying explosive mixture under pressure, and with exhaust ports 15 for escape of the spent gases. Within the casing 12 there is mounted a compressor 16 for each section of the rotor 10 adapted to engage successively in each of the corresponding annular series of combustion chambers 13 as the rotor moves. In the present instance the compressor is shown as a pivoted swinging or oscillating block 16 pivoted at 17 and adapted to be forced down into the explosion chambers 13 by means of a cam 18 and a push rod assembly 19 including a heavy spring 20 employed for the purpose of cushioning the compressor movement into compressing position and for adjusting the push rod length, as more fully described hereinafter. The inner contacting faces of the compressor 16 and the peripheral portions of the rotor 10 including the inner faces of the explosion chambers 13, are curved to produce an extended operative contacting surface, the radial sides of the explosion chambers 13 and of the compressor 16 being also in operative contact. The forward end 16' of each compressor 16 and the rear under face 21 are both formed on curves corresponding with the radii about pivot 17 to engage like contacting and sealing faces formed in the casing 12. A spark plug 22 is mounted in casing 12 just in advance of the forward or head end of each compressor 16, for purposes of igniting the mixture compressed in the forward or head end of each combustion chamber 13 as said chamber passes the spark plug 22 during rotation of rotor 10, thereby causing explosion impulses to be transmitted to the rotor by reason of explosive energy exerted on the leading end wall 23 of each chamber 13.

Considering the structure in greater detail, the forward wall 23 of each firing chamber 13 is in the form of a short inclined face countersunk into the rotor 10 and leading down to an inner elongated curved face 24 forming the bottom of the chamber and cooperating with a correspondingly curved under face or wall of the compressor member 16. The side walls of chambers 13 extend radially and are normally vertically positioned as illustrated, the shaft 11 of the rotor being normally in a horizontal position.

The nature of the moving contacting faces of the bottom wall 24 of the firing chamber and the under side of the compressor member 16 is such that they cannot always be in full contact throughout their length, since otherwise the wall 24 would have to be concentric with the axis 11 which is not done because the wall 24 must slope out gradually to the periphery of the rotor for proper withdrawal of the compressor 16. This results in a sort of shoulder or junction between wall 24 and the periphery of the rotor and has been indicated at S in Fig. 1. In order to provide for proper actuation and contact, the compressor carries an auxiliary compressor member 25 which is T-shape and is mounted to swing upon pivot 26 in a T-shape opening in block 16 (Figs. 1, 3 and 4). A spring 27 carried in a suitable pocket in block 16 serves to urge the T-member 25 outward from the pocket and into engagement with the rotor. To vent this spring pocket a port 28 may be provided as shown.

While the arcs of the under faces of the parts 16 and 25 may be and preferably are formed on radii equal to the radius of the rotor, the center for the arc 24 is necessarily offset from axis 11. As a result, when shoulder S passes from the position of Fig. 1 forward in the direction of rotation (counter clockwise), the forward end 16' of block 16 will be lifted either by shoulder S or by force of an explosion (preferably the latter) so that block 16 may then ride along the periphery of the rotor as the rotor continues its travel. In order to maintain a sealing engagement with the bottom wall 24 of the firing chamber so as to prevent loss of the forces of explosion, the spring 27 causes the toe 25' or forward end of the auxiliary T-shape compressor 25 to be continually forced into engagement with wall 24, thus effectively swinging the part 25 outward about pivot 26 away from part 16. Thus the forward tip of toe 25' tends to drag on wall 24 to maintain the seal, thereby constituting a continuing stationary abutment in the firing chamber after the block 16 recedes. This relationship may be assured by beveling the forward upper edge of toe 25' with respect to the adjacent portion of the end 16' of block 16 so that the effect of explosion forces in the firing chamber 13 will tend to force member 25 into engagement with wall 24.

Thus, when compressor 16, 25 drops onto wall 24 for initial compression, the wall 24 will be fully engaged by the under faces of the compressor parts, but when shoulder S moves forward and explosion takes place block 16 will be elevated about its pivot 17 thus elevating pivot 26 and the rear end of member 25 while toe 25' of the latter remains in engagement with wall 24 as indicated in Fig. 4, member 25 thereafter gradually rising up into block 16 as the rotor continues its rotary travel. This description will make clear the action of the compressor parts 16, 25 so that future description will refer to the construction and action of the compressor as a unit only.

The periphery of the rotor may contain parallel machined sealing grooves 30 external to the explosion chambers 13, extending circumferentially around the rotor and spaced axially. Each series of chambers 13 is thus provided with two grooves 30 extending around the rotor and external to the chambers. The casing parts 12 are provided with ridges 31 which have a running fit in the grooves 30. The purpose of these ridges and grooves is to seal the sides of each firing chamber series against loss of pressure in order that the driving force of the exploded fuel charge may exert its full force upon the rotor to produce a forward rotary motion.

Each compression member 16 is forced into its respective series of explosion chambers 13 as they rotate into firing position, by means of the cam 18 and push rod assembly 19, 20 or any other mechanical arrangement suited to actuate the compression member. In the mechanical arrangement shown in the Figure 1, cam 18 is mounted upon a shaft 38 which is carried by bearings 40 in a housing 39 mounted on the casing 12 to enclose the cam shaft and push rod assemblies. The shaft 39 is provided with a sprocket 42 which is in alignment with another sprocket 43 positioned upon the rotor shaft 11. The two sprockets 42 and 43 are mechanically connected by a chain 44 in such a manner that rotation of sprocket 43 causes a corresponding directional rotation of the sprocket 42. The relationship between the two sprockets 42 and 43 is such that as the explosion chambers on the rotor rotate into firing position, the cam 18 forces the push rod assembly 19 downward. The rod 19 in its downward movement forces the compression member 16 into the explosion chamber thereby compressing the explosive mixture into the firing chamber 13 formed by the leading wall 23 of the explosion chamber 13, the forward wall of the compression member 16, the inner curved wall 24 of the chamber 13, its side walls and the casing 12.

The push rod assembly 19, 20 comprises an outer casing or sleeve 45 in which slides an inner sleeve 46. A stud bolt 47 is seated fast within the inner sleeve 46 and slides through a web 45' in the lower end of the outer sleeve or casing 45 and is the means of adjusting the length of the push rod assembly by means of lock nuts 49 on its lower end which is enclosed by a cap-like foot 48 threaded on the end of sleeve 45. The coil spring 20 forces the inner sleeve 46 upward within the outer sleeve 45 to the extent allowed by the stud bolt adjustment 47, 49. The purpose of this spring is to furnish the necessary adjustment between the contacting faces of the rotor and the compression member to compensate for wear or the accumulation of deposits upon these surfaces and to cushion the action.

A number of compression retainers are provided in various positions to maintain compression and prevent leakage. Thus compression retainers 51 are positioned in the inner rotor-engaging walls of the upper casing part 12 so as to contact with the peripheral surface of the rotor 10 both forward and rearward of compressor 16. The lower part of casing 12 is also provided with a set of these compression retainers as at 52. To seal the forward contacting curved surfaces 16' of the oscillating compression member 16 and the upper casing part 12, a set of compression retainers 53 is provided, and to seal between the rear curved surface 21 of this oscillating member 16 and the casing 12 another set of compression retainers 54 is provided. Compression retainers 55, as shown in Figure 6, are seated in the side walls of the compression member 16 and seal the side walls of the compression member with respect to the inner walls of the recesses in which these compression members move. Each of these compression retainers comprises a rectangular bar of metal M seated within a close fitting slot machined into one surface and held in contact with an opposing surface by means of a strip of curved spring steel 55. The same structure may be used for the other compression retainers.

A brief description of the method of operating my rotary engine is as follows: A charge of fuel and air is introduced into each explosion chamber 13 as it rotates into charging relation with the intake port 14. The method used to inject the fuel and air into the explosion chamber by port 14 may be accomplished by means of a supercharger which injects the fuel mixture under pressure or other mechanical means (not shown) conventional in the art of feeding gaseous fuel to internal combustion motors. The explosion chamber so charged with explosive mixture then rotates into position to receive the compression member 16 and the latter is forced by cam 18 into the charged explosion chamber 13 thereby compressing the fuel charge into the firing chamber formed by the leading wall 23 of the explosion chamber 13, the forward end of compression member 16, and the casing 12. The compressed charge of air and fuel in the firing chamber 28 is then ignited by means of spark plug 22. The force of the exploded charge against the leading wall of explosion chamber 13, causes the rotor 10 to rotate counter-clockwise and drive its shaft 11. Explosion chamber 13 is then rotated by the counter-clockwise movement of the rotor 10 into registry with exhaust port 15 where the combustion products of the exploded charge are discharged tangentially to the revolving surface of the rotor 10. Each of the explosion chambers 13 upon the rotor 10 passes through this same series of steps. Each receives its fuel charge from port 14, after which the fuel charge is compressed by compression member 16 in the firing chamber 13 where the explosion takes place, the rotor then moving forward in a counter-clockwise direction into registry with the exhaust port 15 where the spent gases are exhausted. Each series of explosion chambers 13 positioned upon each section of the rotor 10 is provided with an intake port 14 to supply the fuel, a compression member 16 to compress the fuel charge, and an exhaust port 15 to discharge the spent products of combustion. Furthermore, each series of explosion chambers positioned upon the rotor is provided with the necessary sealing members 55 and the like to confine the gases within the chambers 13. As a result a smooth uniform flow of power is produced which is directly converted into rotary motion of shaft 11. The separate functioning of the two parts 16 and 25 of the compressor was described in detail previously.

It is to be understood the disclosures herein are to be considered only as descriptive and not as limiting of the generic invention which may be variously modified within the scope of the following claims.

This application is a continuation in part of my earlier case Serial No. 551,955 filed July 20, 1931.

I claim:

1. A rotary engine comprising a housing, a rotor journaled within the housing, the rotor having a firing chamber formed therein, means to feed an explosive mixture to said chamber, means to exhaust said chamber, compressor means swingingly carried by the housing, means to force said compressor into said chamber to compress the explosive mixture in said chamber, and means to ignite said mixture, said compressor being provided with a recess on the inner side of the compressor, the recess extending from side to side of the compressor, and an auxiliary member pivoted in said recess and adapted to swing into said firing chamber, the forward end of said member extending from side to side of the compressor and constituting an abutment member for forces of explosion when projecting from said recess.

2. A rotary engine comprising a housing, a rotor journaled in the housing, the rotor having an elongated firing chamber provided in its periphery whose inner wall extends gradually back to said periphery, an elongated compressor member swingingly carried in said housing and sealed therein and adapted to enter said firing chamber in sealing relation therewith to compress a gaseous fluid therein, and to be elevated therefrom after compression as the rotor continues its rotation, and an auxiliary abutment member swingingly mounted in the under side of the compressor member to provide an abutment end in the firing chamber and to continue to engage the bottom wall of said chamber as the compressor member recedes.

3. In a rotary engine the combination of a housing, a rotor mounted therein, said rotor having a firing chamber formed therein, a compressor provided with a recess adjacent to the rotor and adapted to force an explosive mixture into the firing chamber, an auxiliary member pivoted in said recess and adapted to swing into said firing chamber, the forward end of said member extending along the forward end of said compressor.

4. A rotary engine comprising a housing member, a rotor member journaled in the housing, one of said members having a firing chamber formed therein, means to feed an explosive mixture to said chamber, means to exhaust the chamber, compressor means swingingly carried by the other of said members, and means to force said compressor into said chamber to compress the explosive mixture in the chamber, said compressor being alongated in the direction of its plane of movement and the firing chamber being correspondingly elongated, the chamber having an inner curved wall and the compressor having a correspondingly curved wall to engage substantially throughout its length with said curved chamber wall when in compression position, said chamber being largely occupied by said compressor when in initial compression position.

5. A rotary engine comprising a housing member, a rotor member journaled in the housing, one of said members having a firing chamber formed therein, means to feed an explosive mixture to said chamber, means to exhaust the chamber, compressor means swingingly carried by the other of said members, and means to force said compressor into said chamber to compress the explosive mixture in the chamber, said compressor actuating means comprising a yielding push rod bearing upon the compressor and a cam shaft having a cam to actuate said rod.

ELMER W. SHERMAN.